United States Patent [19]

Williams

[11] 4,178,712
[45] Dec. 18, 1979

[54] LIGHT APPARATUS FOR FISHING ROD

[76] Inventor: Chalmer Williams, Rte. 3, Dry Ridge, Ky. 41035

[21] Appl. No.: 848,209

[22] Filed: Nov. 3, 1977

[51] Int. Cl.² .............................................. A01K 91/06
[52] U.S. Cl. ........................................ 43/17; 340/668; 362/802; 362/194
[58] Field of Search ........................... 43/17, 17.5, 25; 362/119, 194, 203, 802; 242/84.2 H, 89.1 L, 89.3; 200/61.17; 340/668

[56] References Cited

U.S. PATENT DOCUMENTS

| | | | |
|---|---|---|---|
| 2,104,888 | 1/1938 | Spahr | 362/194 |
| 2,654,972 | 10/1953 | Hollingsworth | 43/17 |
| 2,995,853 | 8/1961 | Ohliger | 43/17 |
| 3,371,443 | 3/1968 | Dobson | 43/17 |
| 3,521,393 | 7/1970 | Gordon | 43/17 |
| 3,919,801 | 11/1975 | Bart | 43/17 |
| 4,118,882 | 10/1978 | Gorsky | 43/17 |

Primary Examiner—Samuel W. Engle
Assistant Examiner—Edward F. Miles

[57] ABSTRACT

A line-actuated fishing rod light includes an electrically conductive bracket, a battery therein, a threaded-base, bulb, and a spring wire trigger arm coiled to provide a socket for the bulb and extending beyond the socket to form a trigger finger. A fishing line is wrapped around the finger and, upon a fish strike, pulls the arm and socket toward a battery terminal. The bulb lights on contact of its terminal with the battery, through the circuit provided by the battery's rear terminal, a rear wall of the bracket, the bracket, the spring wire arm, the coil socket, and the bulb base. The line disengages from the trigger arm upon playing the fish, so that the light does not interfere with the line during such time. Also, the bulb can be rotated into and out of the coil socket to adjust the light's sensitivity to differing forces exerted on the line.

10 Claims, 3 Drawing Figures

LIGHT APPARATUS FOR FISHING ROD

This invention relates to accessory light for fishing tackle and more particularly to a line-actuated light apparatus for a fishing rod.

Many disclosures of lights for fishing rods have been made over the years and quite a few of these incorporate devices whereby the light is actuated in response to the tension on the fishing line, as when a fish strikes. The known prior devices, however, have been subject to several important disadvantages. For example, after the fish strikes, the light device typically remains in contact with the fishing line and thus frictionally interferes with the line during play of the fish. This is highly distracting to many fishermen, who, for example, may be using a low weight rated line for disproportionately large fish.

Another difficulty with many prior types of lights relates to their sensitivity. Fishing is generally conducted in many types of waters and weather. In calm, still waters, light devices may be highly sensitive since tension executed on the line by ambient conditions is low and very small compared to the strike of a fish. Faster, rougher waters, or high wind situations exert greater forces on the line. In these conditions, the same highly sensitive light devices constantly cycle on and off and the fisherman cannot distinguish (by attention to the light) between actual fish bites and other forces exerted on the line causing the light device to actuate.

Finally, many prior devices are rather complex and expensive and it is highly desirable to produce a line-actuated fishing light which is simple, easily repairable, and inexpensive.

Accordingly, it has been an objective of this invention to provide a rod mounted line-actuated fishing light which does not interfere with the line during play of a fish.

A further objective has been to provide a line-actuated fishing light with an adjustable sensitivity to accommodate variable fishing conditions.

A yet further objective of the invention has been to provide a simple, low cost, and easily maintained line-actuated fishing light.

To these ends, the present invention, in a preferred embodiment, contemplates a line-actuated fishing light which is disengaged from the line upon a fish strike. The light includes a battery in an electrically conductive battery bracket, a bulb and an electrically conductive spring arm attached to the bracket and which comprises both a movable bulb socket and a line engageable actuating trigger. The spring arm is formed to provide a movable socket for the bulb, normally holding the bulb's terminal away from the battery mounted in the bracket. The fishing line is wrapped about the spring arm and when pulled from the rod, as by a fish's bite, pulls the spring arm and bulb socket therein toward the battery until the bulb's terminal engages the battery terminal. The battery bracket engages the battery terminal at its rear end and the bulb lights via the circuit formed by the battery, bracket, spring arm and socket. Continued pulling of the line pulls the line's loop off the spring, releasing the line therefrom, but only after lighting of the bulb has indicated a strike.

Sensitivity of the light is provided by rotating the bulb, in its socket, toward or away from the battery terminal. Thus, if conditions worsen and forces act on the line so as to light the bulb in the absence of a strike, the bulb can be rotated away from the battery. This requires greater line tension to move the spring arm and its socket through a greater distance in order to light the bulb.

In the preferred embodiment, the spring arm comprises a spring wire attached to the bracket, coiled adjacent a battery terminal to form the bulb socket and continuing outwardly from the bracket where it is bent to form a spring finger over which the fishing line is looped.

In an alternate use, simple manual pressure against the spring will energize the light for needed localized illumination during night fishing.

Accordingly, the invention provides a simple line-actuated fishing light which indicates fish strikes, does not interfere with the line during play of the fish, and is adjustable to accommodate varying water and weather conditions.

These and other objectives and advantages will become more readily apparent from the following detailed description of a preferred embodiment from the drawing in which.

Figure 1:
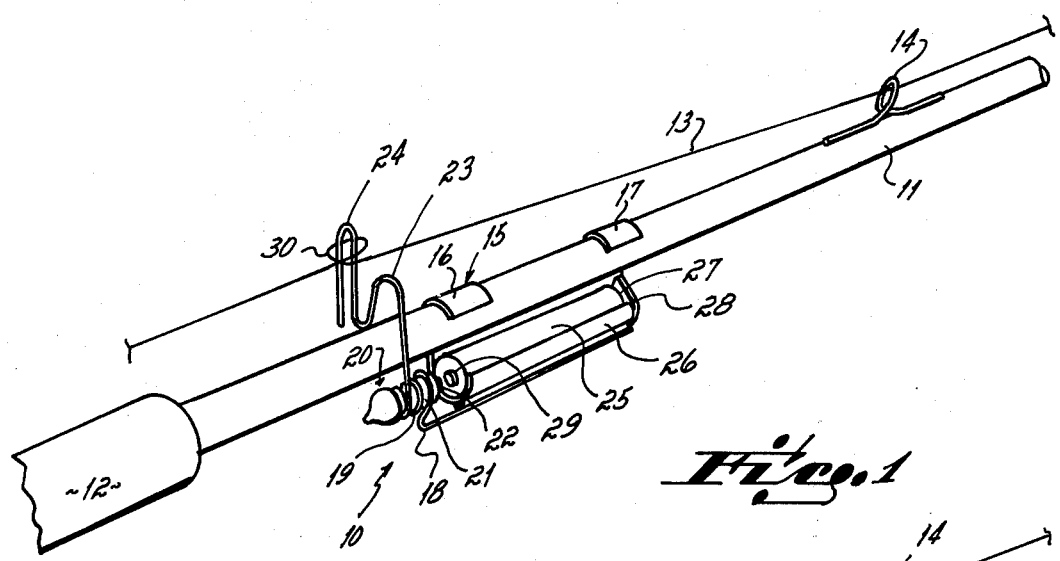
FIG. 1 illustrates the light of the invention set to indicate fish strikes.

Turning to the drawings, a preferred line-actuated fishing light 10 according to the invention is shown in FIG. 1. The light is mounted on a fishing rod 11 having a handle 12 and provided with a fishing reel (not shown). Fishing line 13 extends from the reel toward the far tip end of the rod and through line guide 14.

The light 10 includes a bracket 15 formed of an electrically conductive material and having two clamps 16 and 17 for releasably securing the bracket 15 to the rod 11. A trigger arm 18, formed from an electrically conducting spring wire, is soldered or otherwise operatively attached to one end of the bracket 15, and is in electrical communication with the bracket. The spring wire is coiled at 19 to form a socket for a bulb 20, having a threaded base 21 and a terminal 22. Any typical flashlight bulb so construed can be used so long as it can be energized to produce light from a battery 25 mounted in bracket 15.

From the coil 19, the wire continues and forms first bend 23 and a second bend or spring trigger finger 24. Bend 23 has a bend radius which is greater than that of the bend forming finger 24 as will be further discussed.

The battery 25 is placed in a clamp portion 26 of bracket 15. Battery 25 preferably comprises a common "AA" 1.5 volt penlight battery and is releasably but tightly held in clamp portion 26 of bracket 15 such that its terminal 27 engages wall 28 of bracket 15. Wall 28 is preferably formed from an integral portion of the electrically conductive bracket 15. Terminal 29 of the battery does not engage the bracket.

In use, line 13 is looped around trigger finger 24 of spring wire 18. In a normal position, the spring wire is positioned as shown in FIG. 1 so the terminal 22 of bulb 20 does not engage terminal 29 of the battery 25. So long as conditions remain static, the light 10 remains in the condition shown in FIG. 1.

Figure 2:
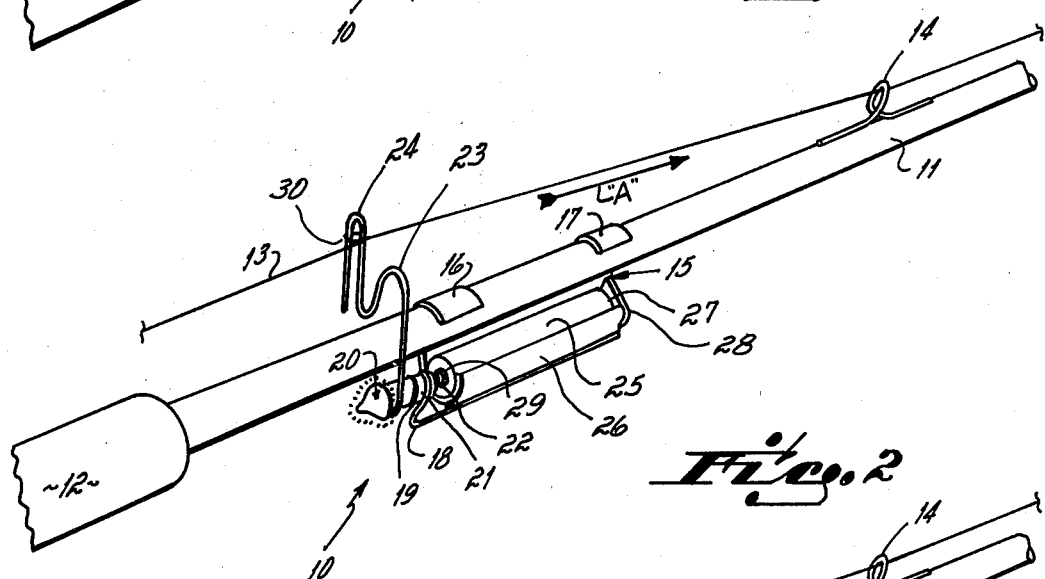
FIG. 2 illustrates the invention indicating a fish strike.

Should a fish strike the bait (not shown) on the other end of line 13, tension in line 13 tightens a loop 30 in the line 13 which has been looped around the finger 24. The force of the strike pulls the trigger finger 24 forwardly in the direction of arrow A (FIG. 2). Forward movement of the spring 18 caused by the strike causes the bulb 20 to move forwardly also so that terminal 22 of the bulb contacts terminal 29 of the battery, whereupon the bulb lights. Lighting of the bulb is produced by the circuit through the battery, integral bracket wall 28, the bracket 15, wire 18, and threaded base 21 of the bulb 20.

Figure 3:
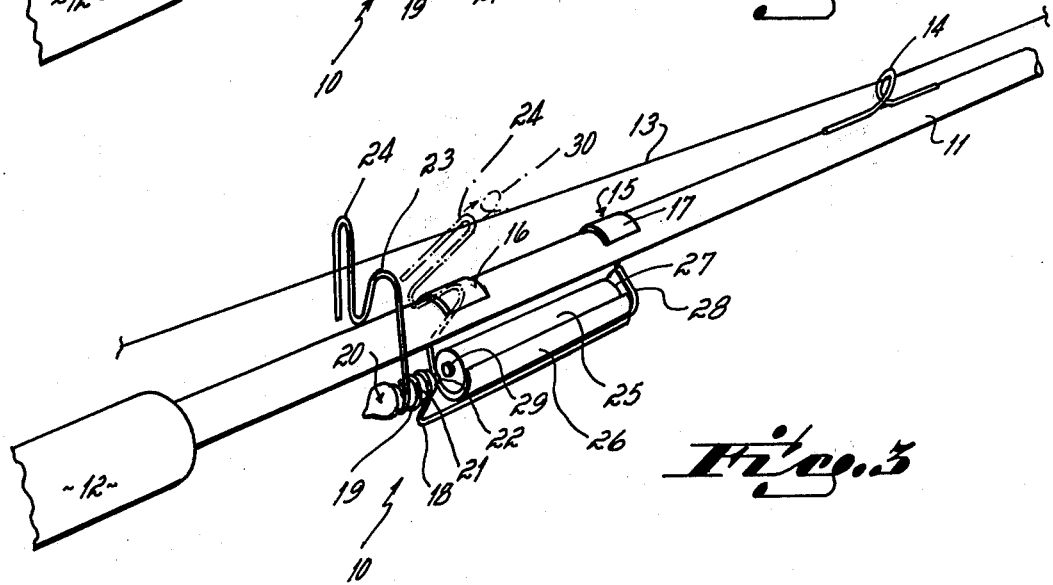
FIG. 3 illustrates the line disengaged condition of the invention during play of a fish.

Continued pulling on line 13 by the fish tends to pull the wire and the bends 23 and 24 toward the tip end of the rod 11 where the ends of the bends point toward the tip end of the rod and the loop 30 of line 13 slips off the finger 24. When loop 30 slips from finger 24, the spring 18 is released and it springs rearwardly, toward the reel end of rod 11, removing the bulb from the battery terminal 29 whereupon the bulb is extinguished. Of course, should the fish only lightly strike the bait, the line 13 will only be temporarily tensioned and may not be pulled from finger 24, whereupon the light 10 will remain set for further strikes. Once, however, the fish has struck the bait and continued to pull line 13 so that it releases from finger 24, the condition of the light is as shown in FIG. 3. In this condition, the line has been pulled from the wire 18, which no longer engages or interferes with the line 13 in any way. Thus, after the bait has been taken, the fish may now be played freely and without line interference caused by the light apparatus 10.

Should it be desired to adjust the sensitivity of the light apparatus 10 such as for example, where waves, current or wind tend to exert forces on line 13 such as will actuate light 10 and energize the bulb, the bulb 20 can be screwed outwardly of the socket, thereby moving bulb terminal 22 further away from battery terminal 29. This results, as can be appreciated from the drawing, in a greater distance through which terminal 22 must be moved in order to contact the terminal 29. Such greater movement correspondingly requires a greater distance of movement of the spring wire 18 and thus a greater force must be exerted on line 13 before the light will be activated. Accordingly, selective positioning of the bulb 20 in the coil 19 is operable to adjust the sensitivity of the light apparatus 10 so that the bulb 20 will not be effectively activated or lit by ambient conditions, such as current or wind, but will only be activated by greater forces, such as those exerted by particular fish's strike. This sensitivity adjustment thus permits the actuation of the apparatus in response to selective predetermined line tensions based on ambient fishing conditions.

In a further aspect of the invention, it will be noted that the bend 23 is of a greater bend radius than bend radius of trigger finger 24. In this regard, it should be noted that if the line 13 were wrapped about bend 23, it would tend to make the light more sensitive since it eliminates the elasticity of the wire 18 between trigger finger 24 and bend 23, and thus renders the light more sensitive. Also, it is to be noted that the line 13 more readily disengages from a larger radius bend such as 23, as opposed to a lower radius bend such as that provided in trigger finger 24. Thus, the utilization of the bent portion 23 of the wire 18 results in a generally more sensitive setting of the light 10, and a quicker line release, for similar positions of bulb 20 and coil 19, than does the utilization of trigger finger 24. This provides even greater sensitivity adjustment.

It will be further appreciated that the clamps 16 and 17 permit ready removal of the bracket 15 from the rod 11. Also, it shall be noted that while the clamp portion 26 securely holds the battery 25 in place, a battery may be simply removed from the bracket by prying it out of the clamp 26 and thereafter replacing it with a fresh battery.

With respect to the spring wire arm, it should be appreciated that the bracket could be formed of non-electrically conductive material and that the spring arm could be extended along the bracket into a position for engaging the terminal on the far end of the battery. Alternately, of course, the spring arm could be connected to a wire extending from the far battery terminal. As shown in the drawings, spring wire 18 is attached to the end of the bracket near the bulb socket and is extended to the other end, this not being necessary when the bracket is electrically conductive.

Further, it should also be noted that the light may be activated to provide general localized illumination for night fishing by manually urging the wire 18 so as to move the bulb terminal 22 into contact with battery terminal 29. Finally, it should be noted that the invention could be modified to accommodate varying bulb and battery combinations wherein the bulb is held in a movable socket.

These and other modifications will become readily apparent to those of ordinary skill in the art without departing from the scope of this invention and the applicant intends to be bound only by the claims appended hereto.

I claim:

1. Line-actuated light apparatus for a fishing rod comprising:
   a bracket including means for releasably attaching the bracket to a fishing rod, means for releasably holding a battery therein, and means at one end of said bracket for operatively contacting one terminal of a battery placed in said releasable battery holding means,
   a yieldable trigger arm attached at one end to another end of said bracket and having a fishing line engageable trigger finger at another end of said arm, said arm further comprising a bulb socket operatively and movably disposed in relation to another terminal of a battery in said releasable battery holding means,
   said means for operatively contacting said one terminal of a battery being electrically connected to said bulb socket; and
   wherein said trigger arm includes two trigger fingers formed therein proximate said other end thereof, a first trigger finger comprising a bend in said arm and having a first bend radius, and a second trigger finger comprising a bend in said arm having a lesser bend radius than the first bend radius, said fingers being formed one after the other in said trigger arm and said fingers extending outwardly of said bracket to a position for engagement with a loop in a fishing line when said bracket is mounted on a fishing rod, said finger being disengageable from said line in response to a predetermined tension exerted on said line.

2. Apparatus as in claim 1 wherein tension exerted on said line pulls said trigger arm and said socket in a direction toward said other terminal of a battery operatively disposed in said bracket.

3. Apparatus as in claim 2 further including a battery in said bracket and a bulb in said socket, said bulb being screwed into said socket and rotatable therein for moving a terminal of said bulb toward and away from said other terminal of said battery for adjusting the sensitivity of said apparatus to actuation by a fishing line.

4. Apparatus as in claim 1 wherein said first trigger finger is disposed in said trigger arm between said socket and said second trigger finger, said apparatus being more sensitive to actuation by a fishing line of said first trigger finger than by actuation by a fishing line of said second trigger finger.

5. Apparatus as in claim 1 wherein said trigger arm is resilient.

6. Line-actuated light apparatus for a fishing rod having a fishing line extending substantially from a handle end toward a tip end, said light apparatus comprising:

an electrically conductive bracket including clamp means for releasably securing said bracket to said rod, means for releasably holding a battery therein and a battery, of the type having a terminal at each end thereof, releasably held in said holding means, and electrically conductive means integral with said bracket operatively contacting one of said battery terminals, an electrically conductive spring wire trigger arm connected at one end to said bracket at another end thereof, said trigger arm having a line engageable trigger finger at another end thereof, and said arm further including an integral coiled portion forming a bulb socket, a threaded-base bulb rotatably disposed in said socket, said bulb having a terminal at one end of said base and said bulb terminal disposed by said socket in operative proximity to another terminal of said battery, said bulb socket being movable toward and away from said other battery terminal, said bulb lighting when said bulb terminal engages said battery terminal in response to movement of said socket toward said battery when force on a fishing line looped around said trigger arm is exerted in a direction toward said rod tip, wherein said trigger arm is disengageable from said line upon a predetermined force exerted on said line after engagement of said bulb terminal with said other battery terminal, and wherein said trigger arm comprises two trigger fingers formed therein proximate said other end thereof, a first trigger finger comprising a bend in said arm and having a first bend radius, and a second trigger finger comprising a bend in said arm having a lesser radius than the first bend radius, said trigger fingers extending outwardly of said bracket to a position for engagement with a loop in a fishing line when said bracket is mounted on a fishing rod, said fingers being disengageable from said line in response to a predetermined tension exerted on said line.

7. Apparatus as in claim 6 wherein tension exerted on said line pulls said trigger arm and said socket in a direction toward said other terminal of a battery operatively disposed in said bracket.

8. Apparatus as in claim 7 further including a battery in said bracket and a bulb in said socket, said bulb being screwed into said socket and rotatable therein for moving a terminal of said bulb toward and away from said other terminal of said battery for adjusting the sensitivity of said apparatus to actuation by a fishing line.

9. Apparatus as in claim 5 wherein said first trigger finger is disposed in said trigger arm between said socket and said second trigger finger, said apparatus being more sensitive to actuation by a fishing line of said first trigger finger than by actuation by a fishing line of said second trigger finger.

10. Apparatus as in claim 6 wherein said trigger arm is resilient.

* * * * *

UNITED STATES PATENT AND TRADEMARK OFFICE
CERTIFICATE OF CORRECTION

PATENT NO. : 4,178,712
DATED : December 18, 1979
INVENTOR(S) : Chalmer Williams

It is certified that error appears in the above-identified patent and that said Letters Patent are hereby corrected as shown below:

Col. 6     Line 30     "5"          should be --6--

Signed and Sealed this

First Day of July 1980

[SEAL]

Attest:

Attesting Officer

SIDNEY A. DIAMOND

Commissioner of Patents and Trademarks